UNITED STATES PATENT OFFICE.

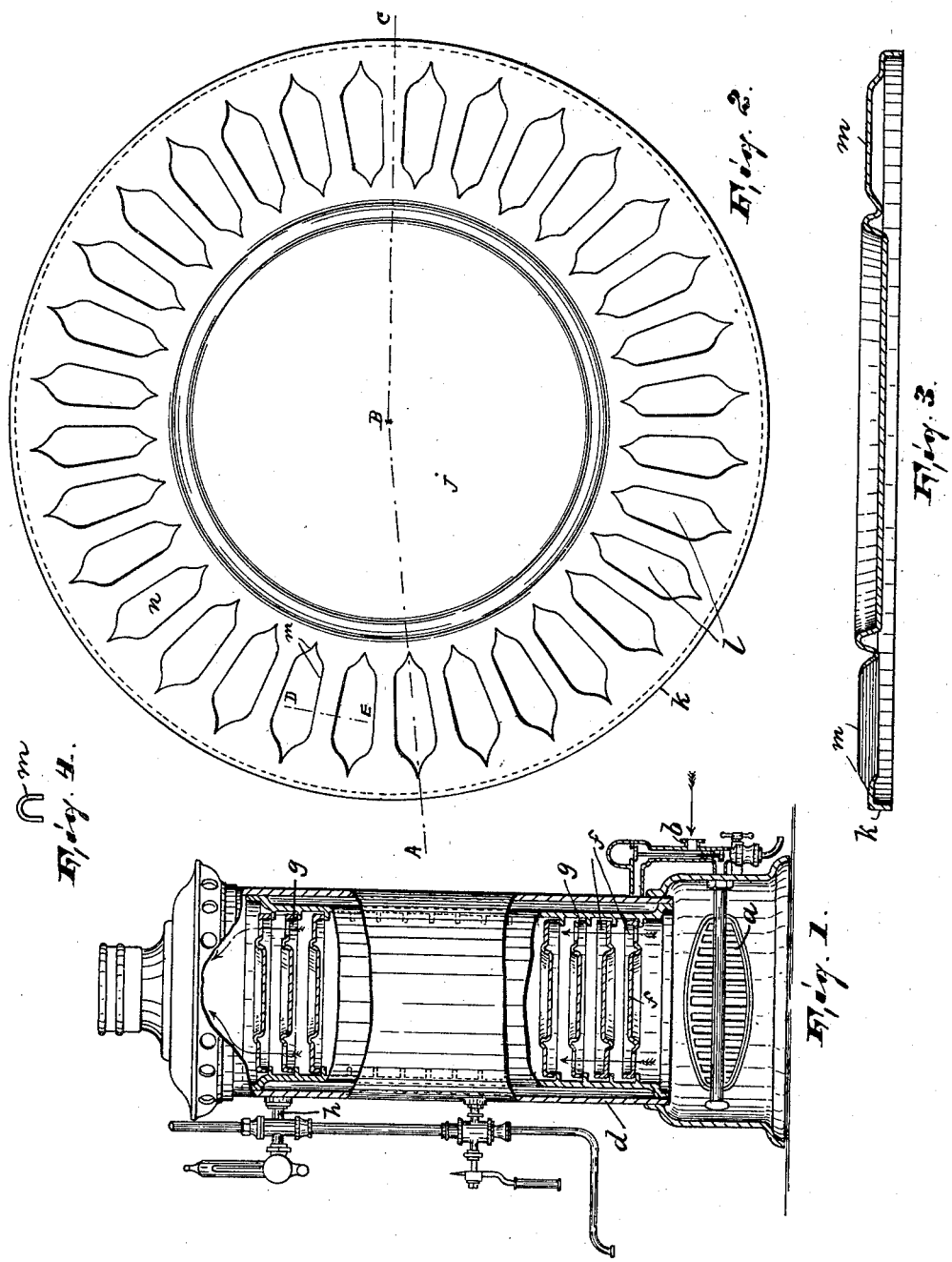

HENRI VANDERBORGHT, OF BRUSSELS, BELGIUM.

APPARATUS FOR RAPIDLY HEATING LIQUIDS.

SPECIFICATION forming part of Letters Patent No. 704,600, dated July 15, 1902.

Application filed December 10, 1901. Serial No. 85,384. (No model.)

*To all whom it may concern:*

Be it known that I, HENRI VANDERBORGHT, manufacturer, a subject of the King of Belgium, residing at 30 Rue d'Tdalie, Brussels, Belgium, have invented a new and useful Apparatus for Rapidly Heating Liquids; and I do hereby declare the following to be a full, clear, and exact description of the same.

The present invention relates to an apparatus for rapidly heating liquids; and it consists, essentially, of an arrangement for providing a very large heating-surface for the heating-gases circulating through the apparatus.

The invention is preferably applicable for use in connection with such apparatus as contain the liquid to be heated in an upright cylindrical boiler or vessel, the inner wall of which is submitted to the action of the heating-gases—as, for instance, bath hot-water heaters and apparatus for the manufacture of spirits, boilers for hot-water heating establishments, and the like. The rapid heating of the liquid contained in or circulating through the annular boilers is effected by forcing the heating-gases to pass through a number of plates arranged one above the other in the interior of the apparatus and adapted to take up the heat contained in the combustion-gases and to radiate the heat toward the inner wall of the apparatus or to transmit it to the contents of the latter. These plates have the object of allowing a more complete utilization of the heating agent by their forcing the gases to flow in a zigzag or serpentine course in the immediate vicinity of the inner wall of the apparatus and by their retarding the current, without, however, disturbing the necessary draft, the solid part of the plates serving at the same time for storing up excess heat and for utilizing the latter.

In the drawings, Figure 1 shows a bath-water heater according to this invention in longitudinal section. Fig. 2 is a heating-plate in plan view. Fig. 3 shows a section through the latter on the lines A B C, both being in an enlarged scale; and Fig. 4 is a section of the plate on the line D E, Fig. 2.

The heating apparatus shown in Fig. 1 consists of a cylindrical casing $d$ with double walls and an inlet-tube $b$ for the admission of cold water, a discharge-outlet $h$ for the delivery of the hot water, a gas hearth or burner $a$, arranged below the casing, and heating-plates $f\ g$, arranged one over the other at short distances apart in the inner heating-chamber. The heating-chamber of the boiler $d$ is open at its lower portion toward the burner $a$ and inclosed at the top by means of a convenient cover provided with apertures. The gas-burner $a$ is shown in slightly-inclined position in order to clearly show its shape. In practice, however, the burner is arranged in the horizontal position. The heating-plates $f\ g$, Fig. 1, are throughout of the same shape. They must, however, be made sufficiently large as to rest with their circumferences, flanges, or lugs on the inner wall of the boiler—*i. e.*, to be in contact at all points with this wall. Therefore they must exactly correspond in shape to the cross-section of the boiler heating-chamber. In case the cross-section of the boiler is circular, as shown in the drawings, the plates $f\ g$ must also be circular. However, if the boiler is of oval shape or square the same shape must also be given to the heating-plates.

The shape and construction of the heating-plates are shown in Figs. 2 to 4 on an enlarged scale. Each heating-plate has a solid center $j$ and a solid flange $k$. The annular portion between the center plate $j$ and the flange $k$ is provided with radially-arranged slot-shaped openings arranged at convenient distances from each other and serving as passages for the heating-gases. These radially-slotted plate portions are produced in the following manner: First of all this portion of the plate is provided at convenient distances with radially-arranged notches or cuts $l$. The bridge $m$, remaining between each two of these notches, is then by means of a convenient pincers turned up or cut in some suitable manner, so as to form a suitable open groove, as shown in Fig. 4. These U-shaped bridges $m$ can also be arranged with their openings or channels directed laterally or downward or upward, all of which arrangements would provide for the passage of the heating-gases. However, the uniform arrangement of all the bridges opening downward will probably allow of a more efficient utilization of the heat. By bending and cutting the material between each two cuts $l$ the previously simple slot is spread out to a larger opening, whereby a plate made in this manner finally has the form shown in Fig. 2. The solid center $j$ of the plate is preferably bordered by means of an annular groove, and the flange $k$ is bent either downwardly or upwardly, as shown in Fig. 3 in section, in order to strengthen the whole plate and to provide the necessary rigidness. The slots are preferably placed as near as possible to the circumference of the plate in order to compel the heating-gases to circulate as near as possible to the inner wall of the casing $d$. The edge $k$ of the plate can, if desired, be entirely suppressed, in which case the groove-shaped bridges or intervening parts $m$ between the slots $n$ may extend directly to the inner heating-wall of the boiler $d$ or may be attached to the latter. These plates are according to the present method of production preferably made from sheets of any convenient material. However, they could be cast in suitable molds. The inner wall of the boiler $d$ is provided with projections arranged at convenient distances and serving as supports for the plates. In Fig. 1 of the drawings the lowest plates $f$ are reversed, so as to turn the opening of the grooves $m$ upward. This arrangement has the object of not disturbing the course of the entering heating-gases and of simultaneously preventing any sooty sediments which may be formed from falling back onto the burner $a$. The number of plates depends, of course, on the size and height of the apparatus, which when increased will consequently give a more intense heating of the water circulating through the annular boiler $d$, whereby it is possible to heat the cold water entering the boiler at $b$, so as to be drawn off in a boiling state at $h$.

The heating-plates $f$ $g$ should preferably be so arranged in the heating-chamber that the slots $n$ of the one plate alternate with or overlap the bridge-pieces $m$ of the next higher plate, whereby the heating-gases passing through the slots $n$ are compelled to take a zigzag or serpentine course, and thus to constantly surround the solid parts of the plates.

The described heating apparatus operates as follows: The hot gases of combustion ascending from the gas-burner $a$ strike in the first place against the solid center of the lowest heating-plate $f$ and in heating the latter spread toward the circumference, owing to the lack of an outlet in the center. The gases passing then through the slots $n$ of this plate strike against the groove-shaped bridges $m$ of the next higher heating-plate, thus being divided and compelled to pass through the slots $n$ of the next following heating-plate, and so on until they escape through the outlets in the cover into the atmosphere. The heating-gases are therefore compelled to ascend with continuous division in many serpentine lines in the immediate vicinity of the inner wall of the water-boiler, thereby strongly attacking the boiler-wall as well as the radial bridges $m$ and the heating-plates and most efficiently transmitting their heat to the latter. The heat transmitted to the solid center $j$ of the plates is not wasted, as these portions of the plates act as heat-collectors and radiate the heat again through the radial bridges $m$ to the boiler-wall and thence to the water, whereby the latter is heated in a very short time, owing to its ascending in a narrow annular space between the inner and outer walls of the boiler $d$ in the form of a relatively thin layer. The central heating-plates $f$ $g$ serve as a strong support for the inner wall of the boiler, so that the latter can be made of comparatively thin metal without becoming deformed under the influence of the pressure.

Having now particularly described and ascertained the nature of the said invention and in what manner the same is to be performed, I declare that what I claim is—

1. In a liquid-heating apparatus, the combination of a hollow casing having vertical, relatively close-spaced walls forming a liquid-receiving space having an inlet-opening at the bottom and an outlet-opening at the top, and a series of superposed spaced plates arranged substantially horizontally and fitting within said casing, said plates being imperforate in their central or body portions and having openings near their edge portions, substantially as described.

2. In apparatus of the kind described a circular or other shaped heating-plate adapted to fit the inner diameter of the double-walled casing and to rest upon flanges or projections therein said plate having a series of radial slots near its circumference and a series of intermediate channel-shaped bridges or parts substantially as described.

In testimony whereof I have signed this specification in the presence of two subscribing witnesses.

HENRI VANDERBORGHT.

Witnesses:
CHARLES HOWARD,
GREGORY PHELAN.